(12) United States Patent
Yoshida et al.

(10) Patent No.: US 6,358,624 B1
(45) Date of Patent: Mar. 19, 2002

(54) POLYCRYSTAL DIAMOND TOOL

(75) Inventors: Katsuhito Yoshida; Junichi Shiraishi; Tetsuo Nakai, all of Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/571,173

(22) Filed: May 16, 2000

(30) Foreign Application Priority Data

May 18, 1999 (JP) .......................... 11-137281

(51) Int. Cl.$^7$ .................................. B22F 7/00
(52) U.S. Cl. ...................... 428/545; 428/408; 428/698; 51/307; 51/309
(58) Field of Search ................. 428/545, 212, 428/323, 408, 698; 51/307, 309

(56) References Cited

U.S. PATENT DOCUMENTS

| 3,745,623 | A | | 7/1973 | Wentorf, Jr. et al. ....... 29/95 B |
| 4,293,618 | A | | 10/1981 | Hara et al. ................. 428/551 |
| 4,871,377 | A | * | 10/1989 | Frushour .................... 51/309 |
| 4,931,363 | A | * | 6/1990 | Slutz et al. ................. 428/408 |
| 5,496,638 | A | * | 3/1996 | Waldenstrom et al. ...... 428/408 |
| 5,624,068 | A | * | 4/1997 | Waldenstrom et al. . 228/262.21 |
| 5,706,906 | A | * | 1/1998 | Jurewicz et al. ............ 175/428 |

FOREIGN PATENT DOCUMENTS

| EP | 0389800 A1 | 10/1990 |

OTHER PUBLICATIONS

"Residual Stresses in Polycyrstalline Diamond Compacts", Tze–Pin Lin et al, Journal of the American Ceramic Society, vol. 7, No. 6, Jun. 1994, pp. 1562–1568.
Megadiamond PCD Diamond Products for Industrial Tooling, 1991.
European Search Report dated Dec. 8, 2000.

* cited by examiner

*Primary Examiner*—Ngoclan Mai
(74) *Attorney, Agent, or Firm*—McDermott, Will & Emery

(57) ABSTRACT

The present invention provides a diamond sintered compact tool. Which is excellent in economy as well as cutting edge strength.

A diamond sintered compact cutting tool comprising a diamond sintered compact sintered at an ultra-high pressure and high temperature and a WC—Co cemented carbide substrate directly bonded to the diamond sintered compact during a step of sintering and brazed to a tool base through the WC—Co cemented carbide substrate, in which a ratio of the thickness of the WC—Co cemented carbide substrate to the thickness of the diamond sintered compact layer satisfies the relation of:

$0.8 \leq$ WC—Co cemented carbide substrate/diamond sintered compact layer $\leq 3.0$ and the diamond sintered compact layer has a thickness of 0.05 mm to 0.5 mm, preferably 0.05 mm to 0.45 mm, more preferably 0.12 mm to 0.36 mm.

10 Claims, 4 Drawing Sheets

(3 of 4 Drawing Sheet(s) Filed in Color)

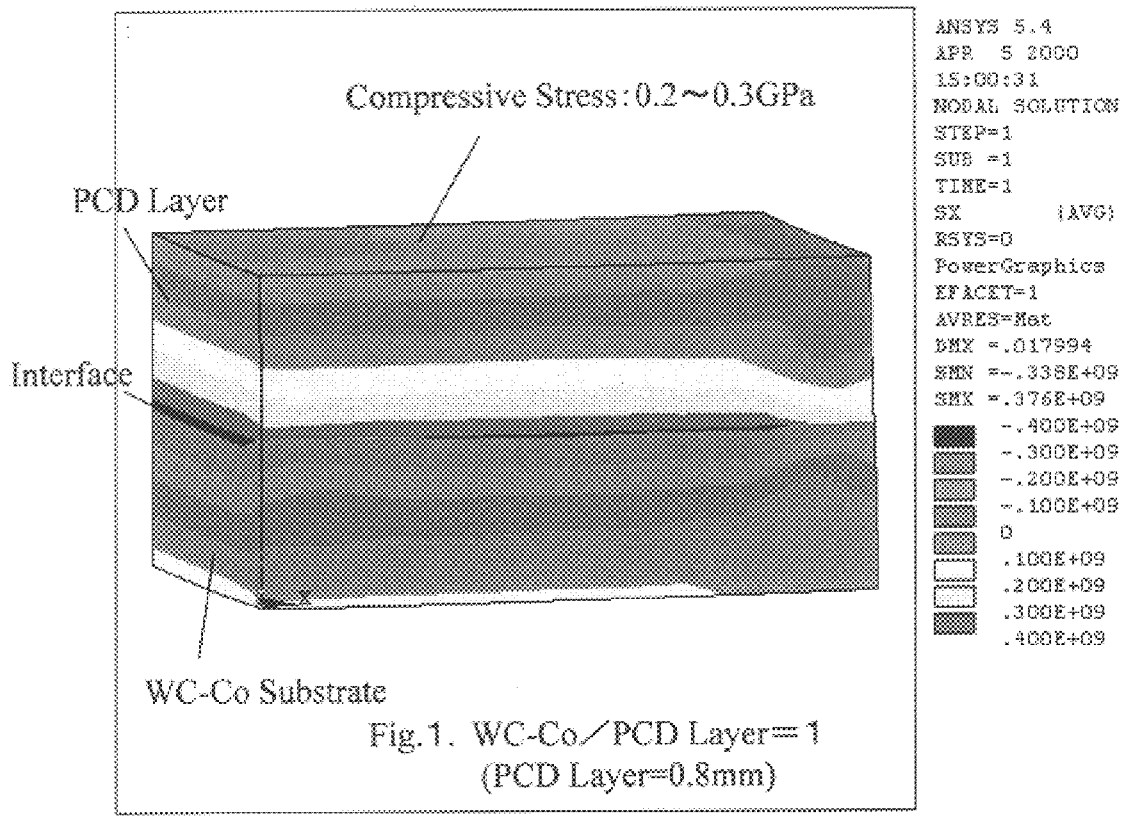
Fig.1. WC-Co／PCD Layer=1
(PCD Layer=0.8mm)
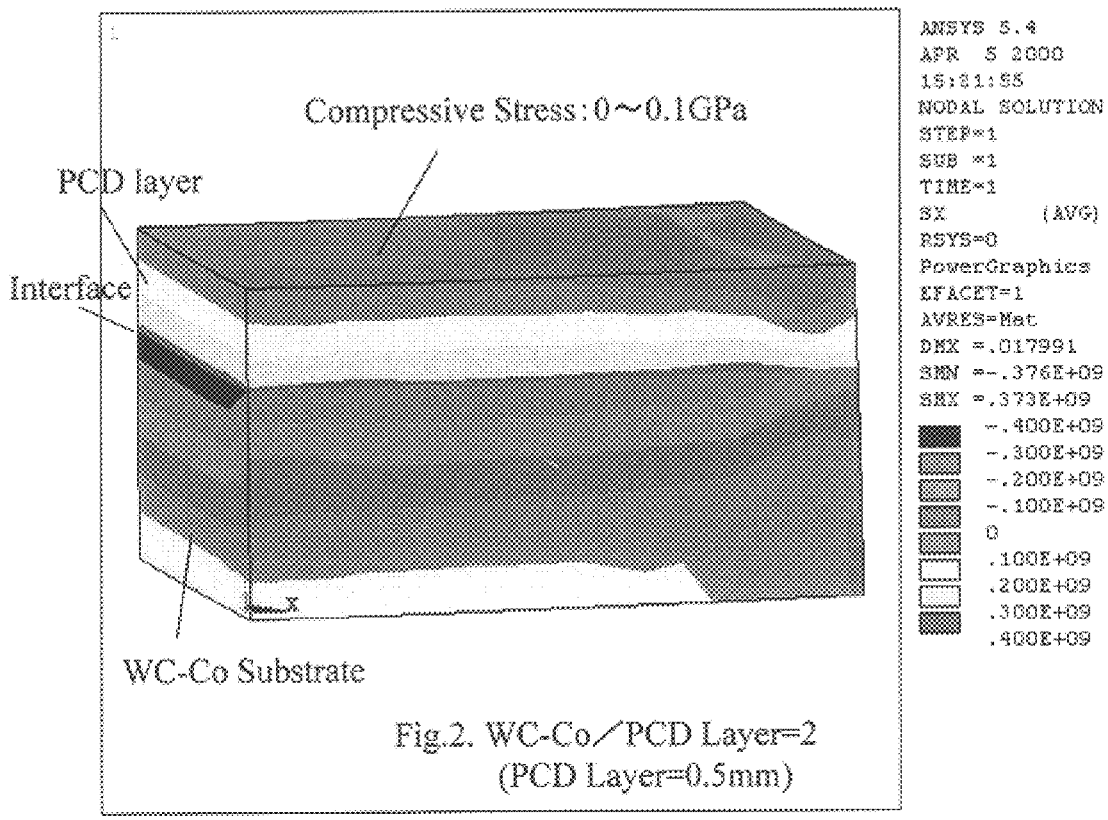
Fig.2. WC-Co／PCD Layer=2
(PCD Layer=0.5mm)

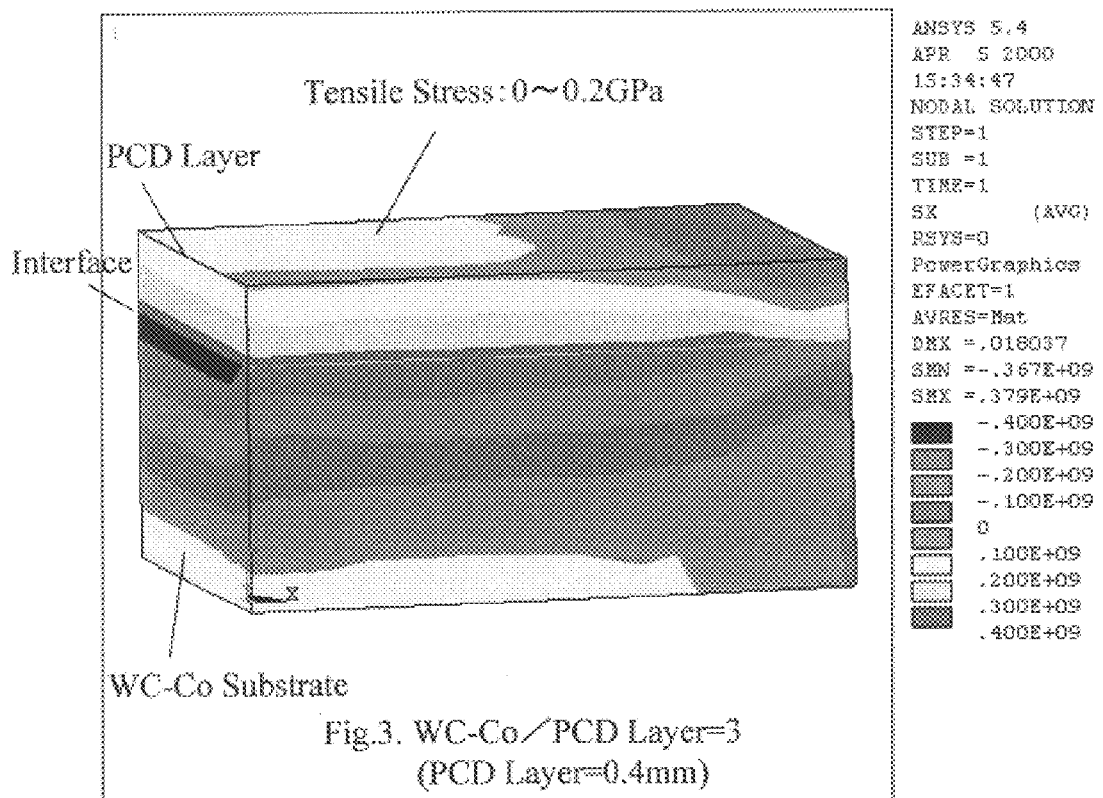
Fig. 3. WC-Co/PCD Layer=3 (PCD Layer=0.4mm)
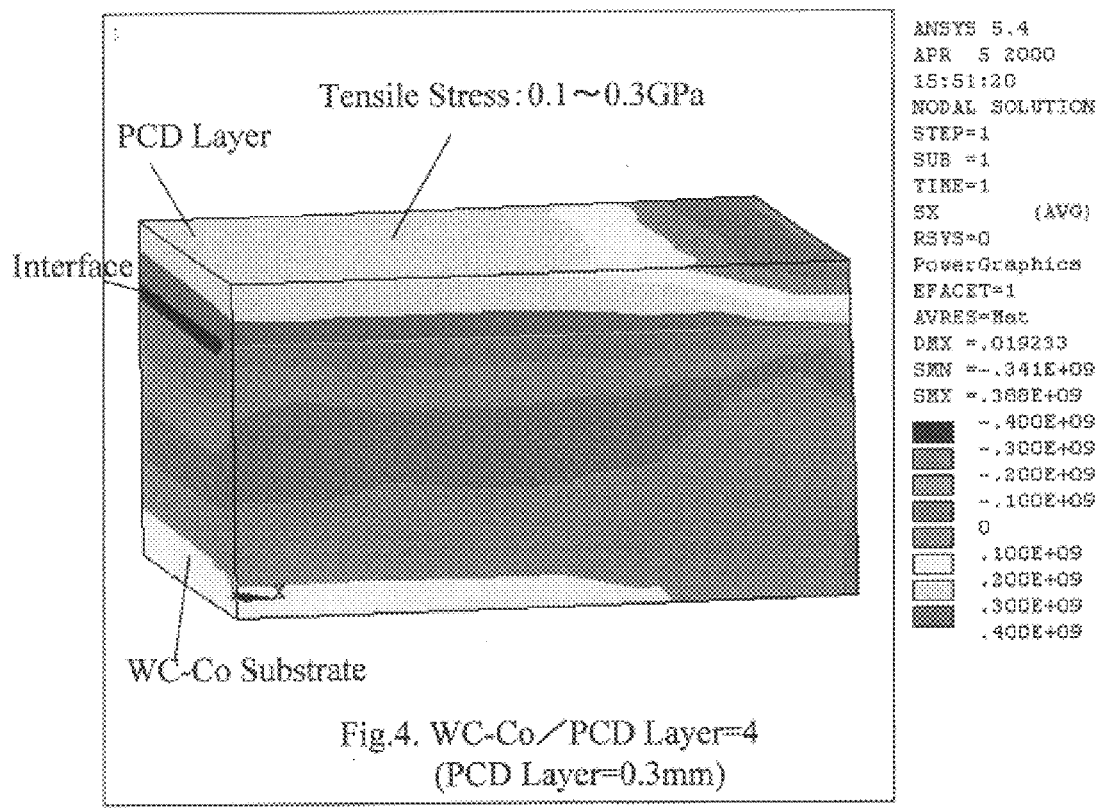
Fig. 4. WC-Co/PCD Layer=4 (PCD Layer=0.3mm)

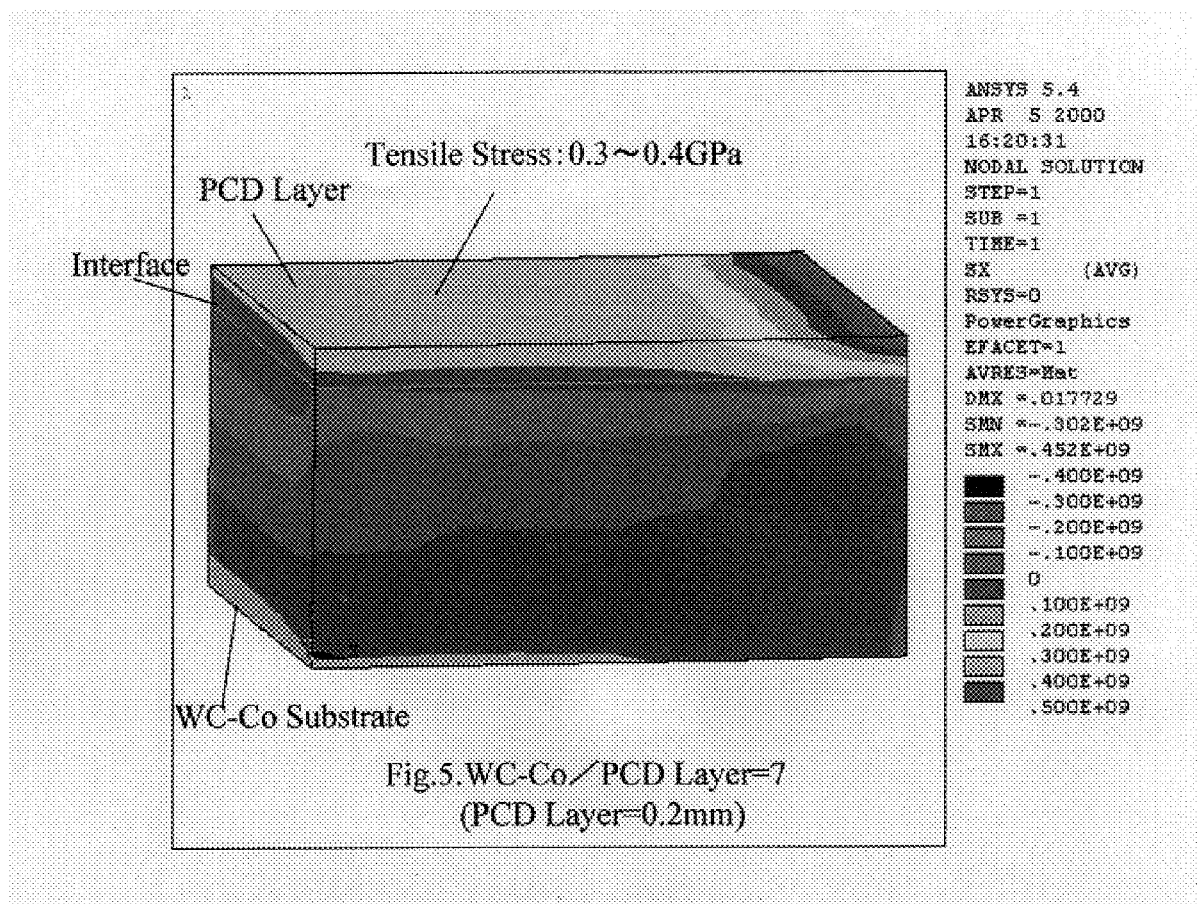
Fig. 5. WC-Co/PCD Layer=7 (PCD Layer=0.2mm)

Normal cutting edge
0.6mm

Cutting edge with chipping caused
by edge preparation

POLYCRYSTAL DIAMOND TOOL

BACKGROUND OF THE INVENTION

1. Field of the Invention

This invention relates to a diamond sintered compact excellent in economy as well as cutting edge strength, in particular, a diamond sintered compact tool whose diamond sintered compact layer thickness is decreased.

2. Description of the Prior Art

At the present time, diamond sintered compacts have been produced for applying to industrial uses such as cutting tools, dies, bits, etc., and used as a dresser, drill bit, wire drawing die, etc. for cutting or working nonferrous metals, plastics, ceramics, etc. Among these tools, in particular, a diamond sintered compact tool used for a cutting tool is generally composed of a tool material comprising a diamond sintered compact layer having a thickness of about 1 mm to 1.5 mm and a WC—Co cemented carbide substrate bonded therewith during a step where diamond grains are sintered with each other, the tool material being cut in a predetermined shape to give a cutting edge of a tool and then brazed to a tool body.

The above described diamond sinterd compact tool has excellent properties for cutting of non-ferrous metals, etc. and has already widely been used. However, since the diamond sintered compact has a higher tool unit cost because of its higher production or working cost as compared with other tool materials, it is indispensable to lower the tool unit cost in order to spread more widely the diamond sintered compact tool. As a trial to lower the tool unit cost, it is considered to decrease the cost for raw materials or finishing a cutting edge by decreasing the thickness of the diamond sinterd compact layer. However, a diamond sintered compact tool having a diamond layer thickness of 0.8 mm to 1.5 mm has ordinarily been used in spite of that in practical uses of the diamond sintered compacts, there are often cases where a thickness of at most 0.5 mm is sufficient. This is Probably due to occurrence of a problem that when the diamond layer is thinner, the strength of the diamond sintered compact is decreased in spite of the material being a same diamond sintered compact and breakage resistance during working is inferior.

SUMMARY OF THE INVENTION

It is an object of the present invention to provide a material for a high strength diamond sintered compact tool, whereby the above described problems of the prior art can be solved.

It is another object of the present invention to provide a diamond sintered compact tool having an excellent cutting edge strength and high breakage resistance with a low production cost.

These objects can be attained by a diamond sintered compact cutting tool comprising a diamond sintered compact sintered at an ultra-high pressure and high temperature range such that diamond is present in stable manner and a WC—Co cemented carbide substrate directly bonded to the diamond sintered compact during a step of sintering and brazed to a tool body through the WC—Co cemented carbide substrate in which a ratio of the thickness of the WC—Co cemented carbide substrate to the thickness of the diamond sintered compact layer satisfies the relation of:

0.8≦WC—Co cemented carbide substrate/diamond sintered compact (Poly-Crystalline Diamond, PCD) layer≦3.0 and the diamond sintered compact layer has a thickness of 0.05 mm to 0.45 mm, preferably 0.12 mm to 0.36 mm.

BRIEF DESCRIPTION OF THE DRAWINGS

The file of this patent contains at least one drawing executed in color. Copies of this patent or patent application publication with color drawing(s) will be provided by the Patent and Trademark Office upon request and payment of the necessary fee.

The accompanying drawings are to illustrate the principle and merits of the present invention in more detail.

FIG. 1 is a perspective view of a sample model of a diamond sintered compact cutting tool by a simulation graphic to illustrate a stress state thereof in the case of a diamond sintered compact layer thickness of 0.8 mm and a WC—Co cemented carbide substrate to diamond sintered compact layer thickness ratio of 1.

FIG. 2 is a perspective view of a sample model of a diamond sintered compact cutting tool by a simulation graphic to illustrate a stress state thereof in the case of a diamond sintered compact layer thickness of 0.5 mm and a WC—Co cemented carbide substrate to diamond sintered compact layer thickness ratio of 2.

FIG. 3 is a perspective view of a sample model of a diamond sintered compact cutting tool by a simulation graphic to illustrate a stress state thereof in the case of a diamond sintered compact layer thickness of 0.4 mm and a WC—Co cemented carbide substrate to diamond sintered compact layer thickness ratio of 3.

FIG. 4 is a perspective view of a sample model of a diamond sintered compact cutting tool by a simulation graphic to illustrate a stress state thereof in the case of a diamond sintered compact layer thickness of 0.3 mm and a WC—Co cemented carbide substrate to diamond sintered compact layer thickness ratio of 4.

FIG. 5 is a perspective view of a sample model of a diamond sintered compact cutting tool by a simulation graphic to illustrate a stress state thereof in the case of a diamond sintered compact layer thickness of 0.2 mm and a WC—Co cemented carbide substrate to diamond sintered compact layer thickness ratio of 7.

DETAILED DESCRIPTION OF THE INVENTION

Figure 6A:
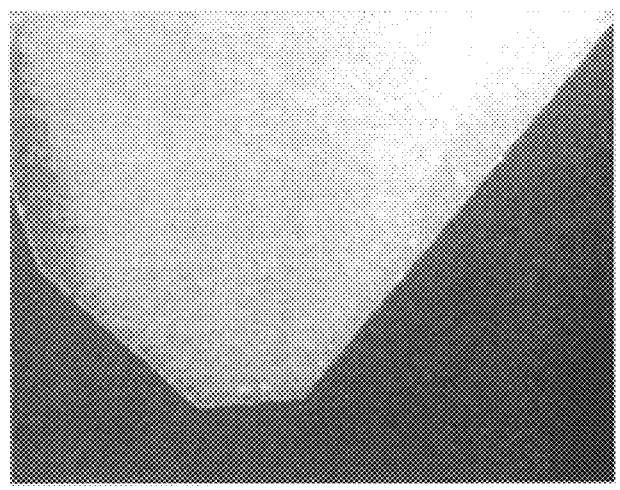
FIGS. 6(A) and (B) are enlarged photographs showing presence or absence of chipping of diamond sintered compact cutting tools according to the present invention and prior art after a cutting working test, depending on the WC—Co cemented carbide substrate to diamond sintered compact layer thickness ratio, (A) being of a sample of the present invention and (B) being of that for comparison.
Figure 6B:
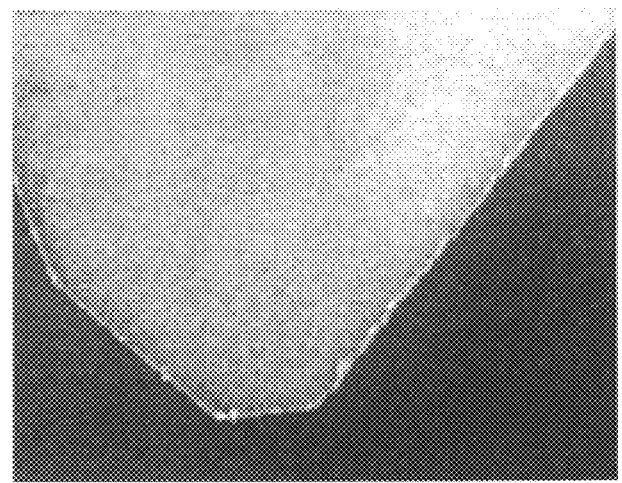

The inventors have made various efforts to obtain a low-priced and high fracture resistance diamond sintered compact for the purpose of achieving the above described objects and consequently, have reached the present invention.

That is, the present invention can be accomplished by making clear an occasion of lowering of the breakage resistance by decreasing the thickness of a diamond sintered compact layer to smaller than the thickness (0.8 mm to 1.5 mm) of the commonly used diamond sintered compact tool and comprises the specified constructions of the present invention summarized below:

(1) A diamond sintered compact cutting tool comprising a diamond sintered compact sintered at an ultra-high pressure and high temperature and a WC—Co cemented carbide substrate directly bonded to the diamond sintered compact during a step of sintering and brazed to a tool body through the WC—Co cemented carbide substrate, in which a ratio of the thickness of the WC—Co cemented carbide substrate to the thickness of the diamond sintered compact layer satisfies the relation of:

0.8≦WC—Co cemented carbide substrate/diamond sintered compact layer≦3.0 and the diamond sintered compact layer has a thickness of 0.05 mm to 0.45 mm. preferably 0.12 mm to 0.36 mm.

(2) The diamond sintered compact cutting tool, as described in the above (1), wherein the diamond grains forming the said diamond sintered compact have a grain size distribution of 0.5 μm to 30 μm, preferably 1 μm to 10 μm.

(3) The diamond sintered compact cutting tool, as described in the above (1) or (2), wherein thermal stress applied to the surface of the cutting tool edge during or after brazing the diamond sintered compact to the tool body through the WC—Co cemented carbide substrate is a compressive stress.

(4) The diamond sintered compact cutting tool, as described in any one of the above (1) to (3), wherein the WC—Co cemented carbide substrate has a thickness of 0.1 to 0.9 mm.

(5) The diamond sintered compact cutting tool, as described in any one of the above (1) to (4), wherein the brazing is carried out by the use of a silver brazing material, preferably consisting of 30 to 70 weight % of Ag and the balance of at least one of Cu, Zn and Ni.

(6) A diamond sintered compact material comprising a diamond sintered compact sintered at an ultra-high pressure and high temperature and a WC—Co cemented carbide substrate directly bonded to the diamond sintered compact during a step of sintering, in which a ratio of the thickness of the WC—Co cemented carbide substrate to the thickness of the diamond sintered compact layer satisfies the relation of:

0.8≦WC—Co cemented carbide substrate/diamond sintered compact layer≦3.0 and the diamond sintered compact layer has a thickness of 0.05 mrn to 0.45 mm, preferably 0.12 mm to 0.36 mm.

PREFERRED EMBODIMENTS OF THE INVENTION

The fundamental principle of the above described inventions (1) to (6) will now be illustrated hereinafter. Generally, a diamond sintered compact and cemented carbide substrate have respectively a coefficient of thermal expansion of 4.0×10$^{-6}$/K and (5~6)×10$^{-6}$/K. In a step of making a finished tool from a diamond sintered compact material, the diamond sintered compact material is exposed to a high temperature, e.g. at least 600° C. during discharge working or brazing to a tool body material. During the same time, an internal stress occurs in the diamond sintered compact layer due to difference in coefficient of thermal expansion between the diamond sintered compact layer and cemented carbide substrate and it is considered that when this thermal stress is converted into a tensile stress at the cutting edge part, the cutting edge strength is lowered to deteriorate the breakage resistance.

From the above described standpoint of view, it is found as a result of our various studies that when the thickness of a diamond sintered compact layer and cemented carbide substrate is changed, the stress applied to the surface of the tool edge is changed from tensile stress to compressive stress. Thus, furthermore, we the inventors have studied such a condition that the stress applied to the surface of the tool edge is converted into compressive stress, and conseuqently, have found that the compressive stress appears when the thickness ratio satsfies the relationship of:

WC—Co cemented carbide substrate/diamond sintered compact layer≦3.0

The present invention is based on the thus obtained knowledge.

Therefore, as the thickness of a WC—Co cemented carbide substrate is thinner, the stress on a cutting edge surface area is a stronger compressive stress and the breakage resistance of the cutting edge is more increased. If the WC—Co cemented carbide substrate is excessively made thinner, however, a large tensile stress acts at the interface between the WC—Co cemented carbide substrate and diamond sintered compact layer to lower the interfacial strength. Thus. the thickness ratio should suitably be:

0.8≦WC—Co cemented carbide substrate/diamond sintered compact layer≦3.0

Considering the balance of the stress on the cutting edge surface area and that at the interfacial part between the WC—Co cemented carbide substrate and diamond sintered compact layer, it is confirmed more preferable to adjust the thickness ratio to the following:

1≦WC—Co cemented carbide substrate/diamond sintered compact layer≦2

As shown in the accompanying drawings, FIG. 1 to FIG. 5 (computer graphics attached herein), the thermal stress state acting on the surface of the diamond sintered compact layer varies depending on the thickness ratio of the WC—Co cemented carbide substrate and diamond sintered compact layer, in which a negative value indicates a compressive stress value and a positive value indicates a tensile stress value.

It can readily be understood from these graphics that when cemented carbide thickness/diamond layer thickness ratio (WC—Co/PCD Layer Ratio)=4 or 7, the diamond sintered compact is subject to tensile stress through heating, when the ratio=3, the stress is substantially zero and when the ratio=1 or 2, compressive stress acts thereon.

Thus, it can be assumed that the strength of the diamond sinterd compact layer is lowered, that is, the tool performance is deteriorated by the action of the tensile stress on the surface of the diamond sintered compact layer. Accordingly, it can be concluded from the simulation results that such a shape or dimension is required as a tool shape that no or little tensile stress is reactd during brazing heating and the relationship of:

WC—Co cemented carbide substrate/diamond sintered compact layer≦3.0 gives the most suitable structure.

The effectiveness of the above described computer simulation can clearly be proved because of being in good agreement with the tendency of the tool performance when subjected to real working as is evident from Examples, in particular, Example 2.

FIG. 6(A) and (B) are photographs respectively of a sample of the present invention and that for comparison, that is, diamond sintered compact cutting tools, taken from their rake faces, to show presence or absence of chipping of the cutting edges after a cutting working test, depending on the WC—Co cemented carbide substrate to diamond sintered compact layer thickness ratio.

As can be seen from these photographs, in the case of the sample having the WC—Co cemented carbide substrate to diamond sintered compact layer thickness ratio within the scope of the present invention, there is scarcely found chipping, whilst in the case of the comparative sample having the thickness ratio outside the scope of the present invention, a number of chippings are found at the cutting edge.

On the other hand, the thinner is the thickness of the diamond sintered compact layer, the more advantageous from the standpoint of production cost. Since it is difficult to stably produce a diamond sintered compact having a thickness of less than 0.05 mm, however, a thickness of at least 0.05 mm is required.

In the present invention, as the diamond sintered compact and WC—Co cemented carbide substrate, there can be used commonly used, well-known diamond. sintered compacts and WC—Co cemented carbide substrates. The WC—Co cemented carbide used in the present invention includes not only those comprising 5 to 25 weight % Co and the balance of WC as a predominant component, but also those further containing some quantity of Ti, Ta, etc. As a shape of the diamond sintered compact material, any type of ordinary inserts, cutting tools, drills, reamers, etc. can be applied.

In the present invention, the thickness of the diamond sintered compact layer can be rendered thinner without deteriorating the breakage resistance of the cutting tool edge, because a stress state on the surface of the cutting tool edge is analyzed and a compressive stress state is obtained on the surface of the cutting tool edge, as illustrated above. That is, the stress state in the diamond sintered compact can be well-balanced by adjusting the thickness ratio of the diamond sintered compact layer and WC—Co cemented carbide substrate to:

0.8≦WC—Co cemented carbide substrate/diamond sintered compact layer≦3.0 whereby the breakage resistance and the interfacial strength at the interface between the WC—Co cemented carbide substrate and diamond sintered compact layer can be maintained. Accordingly, it is possible to provide a diamond sintered compact tool having a sufficient breakage resistance with a low price.

Moreover, the thickness of the diamond sintered compact layer is so thin, for example, as represented by 0.05 mm to 0.45 mm that during cutting edge finish-machining, an amount of scraped diamond is decreased to reduce the machining cost.

In the present invention, furthermore, brazing can generally be carried out at a temperature of 700 to 800° C. using a silver brazing material, for example, brazing material consisting of 30 to 70 weight % of Ag and the balance of Cu, Zn, Ni, etc. A number of other silver brazing materials are known and can also be used in the present invention.

The present invention will now be illustrated in detail by the following Examples without limiting the same.

EXAMPLE 1

A disk made of a cemented carbide (WC—6% Co) with a diameter of 29.5 mm and a thickness of 2 mm was arranged in a capsule made of Ta with an inner diameter of 30 mm. On the cemented carbide disk were charged diamond grains having a grain diameter of 0.5 to 4 μm, which was then covered further with a Co plate with a diameter of 29.5 mm and thickness of 0.05 mm and a disk made of cemented carbide with a diameter of 29.5 mm and a thickness of 3 mm and lightly compressed at a pressure of about 100 MPa. The diamond grains were charged in charged amounts as shown in Table 1.

When this capsule was processed at an ultra-high pressure and high temperature, for example, a pressure of 5.5 GPa and a temperature of 1450° C., a diamond sintered compact with a thickness shown in Table 1, sandwiched in between the cemented carbide disks, was formed. In order to obtain a structure suitable for a tool material, the cemented carbide on one side of the sintered compact was completely removed by means of a surface-grinding machine and electric discharge working device. Consequently, there was obtained a material for a diamond sintered compact tool having a total thickness of about 2 mm and comprising a structure of a diamond sintered compact layer with a thickness of 0.2 to 0.25 mm bonded to a cemented carbide substrate.

Then, from the thus obtained diamond sintered compact material was scraped off the base part of the cemented carbide as shown in Table 1.

This diamond sintered compact material was cut in a predetermined shape and brazed to a tool body to prepare a tool for a milling cutter {diamond sintered compact brazed to one corner of cemented carbide, in the form of a regular triangle with an inscribed circle of 9.525 mm, insert relief angle 11° (overall periphery) and thickness 3.18 mm, and a cutting edge in R-shape of radius of 0.4 mm}.

Using the resulting cutting tool, an estimation test of the cutting properties was carried out under the following conditions shown in Table 2, thus obtaining results shown in Table 3 in which brazing had been carried out using JIS Z3261 BAg-3 as a brazing material by heating in a high frequency heating apparatus at about 750° C.

TABLE 1

| Sample No. | Charged Amount of Diamond (g) | Thickness of Diamond Sintered Compact Layer ① (mm) | Thickness of Cemented Carbide Substrate ② (mm) | ②/① |
|---|---|---|---|---|
| 1 | 1.0 | 0.45 | 0.4 | 0.89 |
| 2 | 1.0 | 0.45 | 0.9 | 2.0 |
| 3 | 0.8 | 0.36 | 0.3 | 0.83 |
| 4 | 0.8 | 0.36 | 0.5 | 1.39 |
| 5 | 0.6 | 0.28 | 0.3 | 1.07 |
| 6 | 0.6 | 0.28 | 0.5 | 1.79 |
| 7 | 0.4 | 0.18 | 0.5 | 2.78 |
| 8 | 0.4 | 0.18 | 0.3 | 1.67 |
| 9 | 0.4 | 0.18 | 0.2 | 1.11 |
| 10 | 0.3 | 0.14 | 0.4 | 2.86 |
| 11 | 0.3 | 0.14 | 0.2 | 1.43 |
| 12 Comparison | 0.15 | 0.07 | 0.1 | 1.43 |
| 13 | 0.6 | 0.28 | 1.0 | 3.57 |
| 14 | 0.4 | 0.18 | 0.6 | 3.33 |

TABLE 2

| Workpiece: | Round Rod of Al–16 weight % Si alloy having six grooves along axial direction |
|---|---|
| Cutting Rate: | 500 m/min |

TABLE 2-continued

Cutting Depth:   0.6 mm
Feed Rate:       0.12 mm/rev
Cutting Time:    3 minutes, wet process

TABLE 3

| Sample No. | Flank Wear Width (μm) |
|---|---|
| 1 | 26 |
| 2 | 32 |
| 3 | 24 |
| 4 | 28 |
| 5 | 27 |
| 6 | 30 |
| 7 | 31 |
| 8 | 29 |
| 9 | 26 |
| 10 | 32 |
| 11 | 28 |
| 12 | 31 |
| Comparison | |
| 13 | broken |
| 14 | broken |

It will clearly be understood from Table 3 that the tool using the diamond sintered compact material according to the present invention exhibits an excellent cutting edge strength without breakage of the cutting edge.

EXAMPLE 2

In an analogous manner to Example 1, various materials each having a thickness of a diamond sintered compact and a thickness of a cemented carbide substrate were prepared as shown in Table 4. This diamond sintered compact material was cut in a predetermined shape and brazed to a tool body made of a cemented carbide to prepare a tool for a milling cutter. 100 test pieces were prepared from these samples, after which cutting edge working was carried out using a diamond wheel of grain size #800 and NC tool grinding disk to examine the yield rate depending on the thickness of the diamond sintered compact layer. In Table 5 are shown the number of working tests, the number of inferior goods and the contents of inferior goods, from which it is apparent that the diamond sintered compacts according to the present invention exhibit the feature that less breakages occur during cutting edge working and the productivity is more excellent.

In comparison of Sample No. 16 according to the present invention and Sample No. 19 according to the prior art, as can clearly be seen from FIGS. 6(A) and (B), a number of chippings are found in the case of Sample No. 19, but chippings are scarcely found in the case of Sample No. 16 according to the present invention.

TABLE 4

| Sample No. | Thickness of Diamond Sintered Compact Layer ① (mm) | Thickness of Cemented Carbide Substrate ② (mm) | ②/① |
|---|---|---|---|
| 15 | 0.45 | 0.9 | 2.0 |
| 16 | 0.28 | 0.3 | 1.07 |
| 17 | 0.18 | 0.3 | 1.67 |
| 18 | 0.07 | 0.2 | 2.86 |
| Comparison | | | |
| 19 | 0.7 | 0.7 | 1 |
| 20 | 0.45 | 1.8 | 4 |
| 21 | 0.28 | 1.0 | 3.57 |

TABLE 5

| Sample No | Number of Inferior Goods Occurred | Yield Rate (%) | Contents of Inferior Goods Occurred |
|---|---|---|---|
| 15 | 1 | 99 | out of size spec. |
| 16 | 0 | 100 | NA* |
| 17 | 1 | 99 | chipping |
| 18 | 2 | 98 | chipping |
| Comparison | | | |
| 19 | 98 | 2 | out of size spec. |
| 20 | 44 | 56 | chipping |
| 21 | 33 | 67 | chipping | note:
*not available

Advantages of Present Invention

The diamond sintered compact material according to the present invention has an excellent strength when used as a tool material for a cutting tool excavator, etc.

What is claimed is:

1. A diamond sintered compact cutting tool comprising a diamond sintered compact sintered at an ultra-high pressure and high temperature and a WC—Co cemented carbide substrate directly bonded to the diamond sintered compact during a step of sintering and brazed to a tool body through the WC—Co cemented carbide substrate, in which a ratio of the thickness of the WC—Co cemented carbide substrate to the thickness of the diamond sintered compact layer satisfies the relation of:

$$0.8 \leq \text{WC—Co cemented carbide substrate/diamond sintered compact layer} \leq 3.0$$

and the diamond sintered compact layer has a thickness of 0.05 mm to 0.45 mm.

2. The diamond sintered compact cutting tool, as claimed in claim 1, wherein the thickness of the said diamond sintered compact layer is in a range of 0.12 mm to 0.36 mm.

3. The diamond sintered compact cutting tool, as claimed in claim 1, wherein the diamond grains forming the said diamond sintered compact have a grain size distribution of of 0.5 μm to 30 μm.

4. The diamond sintered compact cutting tool, as claimed in claim 3, wherein the grain size distribution of the diamond grains is in a range of 1 μm to 10 μm.

5. The diamond sintered compact cutting tool, as claimed in claim 1, wherein thermal stress loaded on the surface of the cutting tool edge during or after brazing the diamond sintered compact to the tool body through the WC—Co cemented carbide substrate is a compressive stress.

6. The diamond sintered compact cutting tool, as claimed in claim 1, wherein the WC—Co cemented carbide substrate has a thickness of 0.1 to 0.9 mm.

7. The diamond sintered compact cutting tool, as claimed in claim 1, wherein the brazing is carried out by the use of a silver brazing material.

8. The diamond sintered compact cutting tool, as claimed in claim 7, wherein the silver brazing material consists of 30 to 70 weight % of Ag and the balance of at least one of Cu, Zn and Ni.

9. A diamond sintered compact material comprising a diamond sintered compact sintered at an ultra-high pressure and high temperature and a WC—Co cemented carbide substrate directly bonded to the diamond sintered compact during a step of sintering, in which a ratio of the thickness of the WC—Co cemented carbide substrate to the thickness of the diamond sintered compact layer satisfies the relation of:

$$0.8 \leq \text{WC—Co, cemented carbide substrate/diamond sintered compact layer} \leq 3.0$$

and the diamond sintered compact layer has a thickness of 0.05 mm to 0.45 mm.

10. The diamond sintered compact material, as claimed in claim 9, wherein the thickness of the said diamond sintered compact layer is in a range of 0.12 mm to 0.36 mm.

* * * * *